United States Patent [19]

Sumal

[11] Patent Number: 4,510,795
[45] Date of Patent: Apr. 16, 1985

[54] METHOD FOR MEASURING AIR FLOW

[75] Inventor: Jaihind S. Sumal, Vaihingen-Ensingen, Fed. Rep. of Germany

[73] Assignee: Robert Bosch GmbH, Stuttgart, Fed. Rep. of Germany

[21] Appl. No.: 417,977

[22] Filed: Sep. 14, 1982

[30] Foreign Application Priority Data

May 19, 1982 [DE] Fed. Rep. of Germany ....... 3218930

[51] Int. Cl.$^3$ .......................................... G01M 15/00
[52] U.S. Cl. ........................................ 73/118; 73/204
[58] Field of Search ................ 73/1 H, 861.49, 118 A, 73/204

[56] References Cited

U.S. PATENT DOCUMENTS

| 4,213,335 | 7/1980 | Peter et al. | 73/204 |
| 4,275,695 | 6/1981 | Bauer | 73/118 |
| 4,311,042 | 1/1982 | Hosoya | 73/118 A |

OTHER PUBLICATIONS

Stoll, H. W., *Flow: It's Measurement and Control in Science and Industry*, vol. 1, Instrument Society of America, 1974, p. 197.

Primary Examiner—John W. Caldwell, Sr.
Assistant Examiner—Ellwood G. Harding
Attorney, Agent, or Firm—Edwin E. Greigg

[57] ABSTRACT

A method is proposed for measuring the throughput of a medium, in particular the air aspirated by an internal combustion engine, in a flow cross section and for correcting the flowthrough measurement value ($U_s$) furnished by a air flow measuring device in the event of a pulsating flow. To this end, the air flow measurement value ($U_s$) is modified, in a selected range of the characteristic curve of the air flow measuring device, in such a manner that the error in the air flow measurement value ($U_s$) resulting from the pulsation of the medium is reduced or compensated for. The range of the characteristic curve selected for modification of the air flow measurement value ($U_s$) preferably is located below a minimum air flow measurement value ($U_{sm}$) characterizing a minimum air flow value ($Q_m$). In like manner, in order to modify the air flow measurement value ($U_s$) below the minimum air flow measurement value ($U_{sm}$) characterizing the minimum air flow value ($Q_m$), a corrective air flow measurement value ($U_{sk}$) can be established, which is smaller than the air flow value ($U_{so}$) at an air flow value of zero.

4 Claims, 3 Drawing Figures 4,510,795

METHOD FOR MEASURING AIR FLOW

BACKGROUND OF THE INVENTION

The invention is based on a method for measuring the air flow of a medium, in particular the air aspirated by an internal combustion engine. In known air flow measuring devices used for measuring the air aspirated by internal combustion engines, as shown, for example, in U.S. Pat. Nos. 4,213,335 and 4,275,695; the pulsations in the aspirated air cause an adulteration of the measurement signal; these pulsations are quite severe in certain operating ranges of the engines. Adulterations of this kind may be caused, first, by possible flow reversals during the pulsation which are not recognized as such by the air measuring device, and, second, by the fact that the response time of the air flow measuring device to changes in the flow direction cannot be made instantaneously. In air flow measuring devices of this kind, the throughput measurement is accordingly interrupted when very severe pulsation is occurring; howwever, this is not satisfactory because it does not bring about any correction of or compensation for the pulsation error.

OBJECT AND SUMMARY OF THE INVENTION

The method according to the invention and as described hereinafter has the advantage over the prior art in that an error in the air flow measurement value $U_s$ resulting from the pulsation of the medium is reducible or correctable.

Further advantageous embodiments of the method disclosed hereinafter render the invention particularly advantageous for reducing or correcting the error in the air flow measurement value $U_s$ resulting from the pulsation of the medium and for modifying a selected range of the characteristic curve of the air flow measuring device, especially a range below a minimum air flow measurement value $U_{sm}$. It is also advantageous, in particular, for reducing the measurement error caused by flow reversals and for establishing a corrective air flow measurement value $U_{sk}$ below the minimum air flow measurement value $U_{sm}$ characterizing the minimum air flow value $Q_m$. This corrective value is smaller than the air flow measurement value $U_{so}$ at a zero air flow value.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
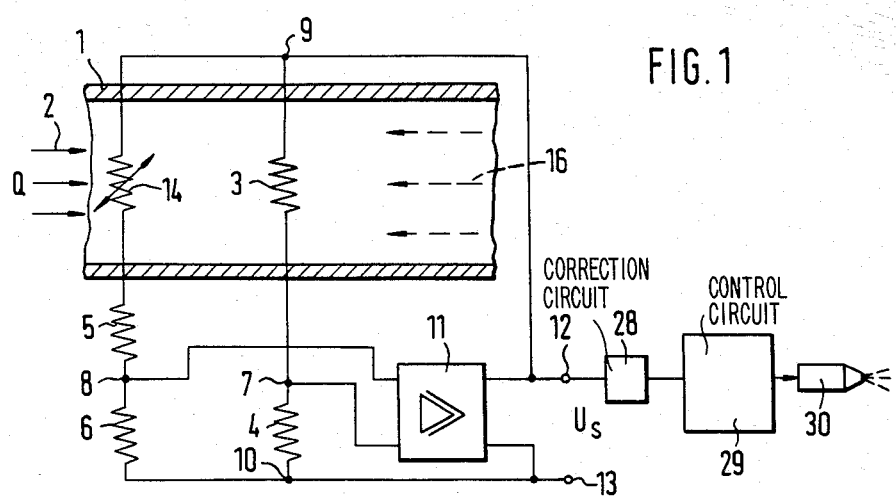
FIG. 1 is a circuit diagram for an apparatus for measuring the mass of a flowing medium and for correcting the air flow measurment value when there is a pulsating flow.

In FIG. 1, a flow cross section 1 is shown, for instance an air intake tube of an internal combustion engine (not shown), through which a medium, for instance the air aspirated by the engine, flows in the direction of the arrows 2. A temperature-dependent measuring resistor 3 is located in the flow cross section 1, for example as part of an air flow measuring device. The measuring resistor 3 may be a hot-layer or not-film resistor, for instance, or a hot wire, which experiences the flow through it of the output variable of a regulator and simultaneously furnishes the input variable for this regulator. The temperature of the temperature-dependent measuring resistor 3 is regulated by the regulator to a fixed value which is above the mean temperature of the medium. If the flow velocity, or in other words, the mass of medium flowing per unit of time and having an air flow value Q now increases, then the temperature-dependent measuring resistor 3 cools down to a greater extent. This cooling is fed back to the input of the regulator, and the regulator thus increases its output variable such that the fixed temperature value is again established at the temperature-dependent measuring resistor 3. The output variable of the regulator, in the event of changes in the air flow value Q of the medium, regulates the temperature of the temperature-dependent measuring resistor 3 to the predetermined value and simultaneously represents a standard measure for the aspirated mass of medium, which can be delivered as an air flow measurement value $U_s$ to a metering circuit of the engine, for instance, for the purpose of adapting the required fuel quantity to the mass of air aspirated per unit of time.

The temperature-dependent measuring resistor 3 is disposed in a resistance measuring circuit, for instance a bridge circuit, and together with a resistor 4 it forms a first bridge branch; a second bridge branch comprising the two fixed resistors 5 and 6 is connected parallel to it. The pickup point 7 is located between the resistors 3 and 4, and the pickup point 8 is located between the resistors 5 and 6. The two bridge branches are connected in parallel at points 9 and 10. The diagonal voltage of the bridge located between points 7 and 8 is supplied to the input of an amplifier 11, and the points 9 and 10 are connected to the output terminals of this amplifier 11, so that its output variable supplies the bridge with operating voltage or operating current. The air flow measurement value $U_s$ simultaneously serving as the adjustment variable can be picked up between the terminals 12 and 13, as shown.

The temperature-dependent measuring resistor 3 is heated, by the current flowing through it, up to a value at which the input voltage of the amplifier 11, that is, the bridge diagonal voltage, becomes zero or assumes a predetermined value. A predetermined current then flows from the output of the amplifier into the bridge circuit. If the temperature of the temperature-dependent measuring resistor 3 varies as a result of changes in the mass Q of the flowing medium, then the voltage at the bridge diagonal also varies, and the amplifier 11 regulates the bridge supply voltage or current to a value at which the bridge is either balanced once again or is unbalanced in a predetermined manner. The output variable of the amplifier 11, that is, the adjustment variable $U_s$, like the current in the temperature-dependent measuring resistor 3, represents a standard measure for the mass of flowing medium, for instance the mass of air aspirated by the engine.

In order to compensate for the influence of the temperature of the medium on the measurement result, it may be efficacious to include a second temperature-dependent resistor 14, which is surrounded by the flow of medium, in the second bridge branch. The size of the resistors 5, 6 and 14 should be selected such that the lost power of the temperature-dependent resistor 14 generated by the branch current flowing through it is so slight that the temperature of this resistor 14 virtually does not vary with changes in the bridge voltage, but instead always corresponds to the temperature of the medium flowing past it.

Figure 2:
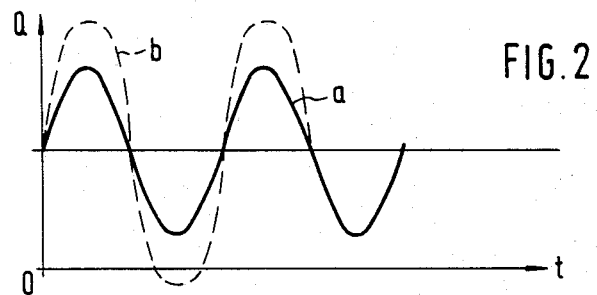
FIG. 2 is a diagram plotting the course of the air flow value A of the mass of a pulsating medium over the time t.

In FIG. 2, the course of the flowthrough value Q of a pulsating mass of medium is plotted over the time t; by way of example, this mass is the mass of air aspirated by an engine. This course of the pulsating flow, in the ideal case, is sinusoidal. In the case of an air flow measuring device functioning on the principle of a baffle valve, when there are pulsating flows an error in measurement occurs because a greater pressure drop is established at the baffle valve when there is a pulsating flow than when the flow is steady. Other air flow measuring devices which do not react to a pressure drop, for instance those operating on the thermal measuring principle, although they are capable of following the course of the pulsating air flow value Q, still make an error in measurement because of the limited response sensitivity of the air flow measuring device. In FIG. 2, the symbol "a" indicates the curve of a pulsating flow in which no reversal of the flow direction occurs. The symbol "b" indicates the curve, shown in dashed lines, of a pulsating flow in which a flow reversal as indicated by the arrows 16 in FIG. 1 does occur. Air flow measuring devices which do not recognize the flow direction of the flowing medium, such as thermal air flow measuring devices, make an error in measurement when there is a flow reversal, because the mass of medium flowing backwards is not subtracted from the air flow measurement value but rather is re-added to it. The error of the air flow measurement value $U_s$ is particularly great in the case of pulsating flows having a high pulsation frequency and small flowthrough values Q.

Figure 3:
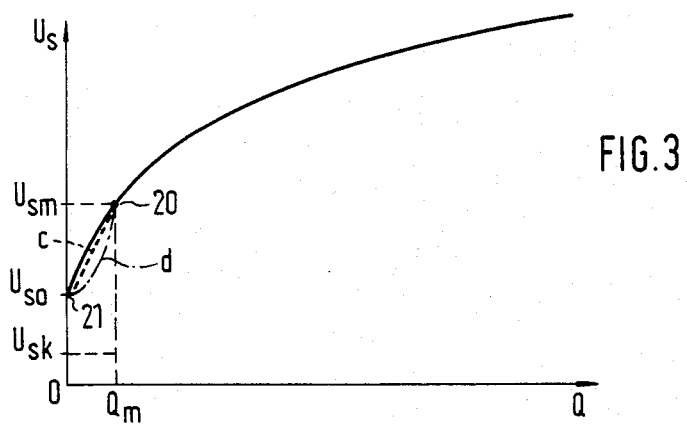
FIG. 3 is a diagram showing the characteristic curve of a air flow measuring device, with the flowthrough measurement value $U_s$ and the air flow value $Q$ of the medium, and the modification of the characteristic curve for reducing or correcting a pulsation error.

FIG. 3 shows the characteristic curve of a thermal air flow measuring device such as that of FIG. 1. The characteristic curve has pronounced slopes in the range where the air flow values Q are low, and thus great changes in the air flow measurement value $U_s$ occur in this range; on the other hand, at relatively large air flow values Q, the slope of the characteristic curve becomes flatter. A air flow measurement value $U_{so}$, which corresponds to a voltage of 1.5 V, for example, is associated with an air flow value of zero. If the air flow measuring device is used for ascertaining the mass of air aspirated by an internal combustion engine, the range of the calibrated characteristic curve which is located below a minimum air flow value $Q_m$—and with which an air flow measurement value $U_{sm}$ is associated—is not required. The minimum air flow value $Q_m$ is then somewhat below the aspirated air mass resulting during engine idling. In accordance with the invention, it is therefore proposed that a range of the characteristic curve located below the point on the characteristic curve marked 20, for the minimum air flow value $Q_m$, be modified in such a manner that an error in the air flow measurement value $U_s$ resulting from the pulsation of the flow is reduced or corrected. This modified range may extend from point 20 to point 21, which represents an air flow value of zero. As indicated by dotted lines at "c", the modified range of the characteristic curve could by way of example take a linear curve, or as indicated by dot-dash lines at "d", it could take a curve such that when the air flow value Q is once again increasing, the increasing air flow measurement value $U_s$ is delayed. By thus modifying the characteristic curve of the air flow measuring device below the minimum air flow value $Q_m$, a desired measurement error of the air flow measurement value $U_s$ is obtained, which error is directed in the opposite direction from the measurement error caused by the pulsation of the flow of the medium, thus causing a reduction or compensation of the pulsation error.

In particular for reducing or compensating for the pulsation error occuring during flow reversals, the characteristic curve of the air flow measuring device may also be embodied such that below the minimum air flow measurement value $U_{sm}$ characterizing the minimum air flow value $Q_m$, a corrective air flow measurement value $U_{sk}$, of 0.6 V, for instance, can be established, this last value being smaller than the air flow measurement value $U_{so}$ of the original characteristic curve given an air flow value of zero. As a result, a detection of the reversed-flow portion of the mass of the medium by the air flow measuring device can be suppressed.

In order to modify the air flow measurement value $U_s$, as shown in FIG. 1, a correction circuit 28 of known design can be used, which is either embodied as an independent unit or as part of an electronic control unit 29 of known design, which as part of an electronic fuel injection system, for instance, triggers at least one electromagnetically actuatable fuel injection valve 30, such as generally shown in U.S. Pat. No. 4,275,695. By means of the correction circuit 28, upon the occurrence of air flow measurement values $U_s$ below the minimum air flow measurement value $U_{sm}$, the above-discussed changes in the air flow measurement value are effected, so that the pulsation error is either reduced or corrected entirely. When the output signal from the flow meter is below a predetermined level, for example, then the signal is modified by the correction circuit 28 according to one of the two functions "c" or "d" defined in FIG. 3.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method for measuring the air flow of the air aspirated by an internal combustion engine in a flow cross section by means of an air flow measuring device which has a characteristic curve determined by the association of an air flow value Q with an air flow measurement value $U_s$ of the air flow measureing device, and for the purpose of correction of the air flow measurement value $U_s$ in the case of a pulsating flow, comprising the steps of, establishing a selected range of the characteristic curve of the air flow measuring device located below a minimum air flow measurement value ($U_{sm}$) corresponding to a minimum flowthrough value ($Q_m$) and extending from an air flow value of zero, having an air flow measurement value ($U_{so}$), as far as the minimum flowthrough value ($Q_m$), and modifying the air flow measurement value ($U_s$) within the selected range defined in the previous step, whereby an error in the air flow measurement value ($U_s$) resulting from the pulsating flow is reduced.

2. A method as defined by claim 1, comprising the further step of establishing a corrective predetermined air flow measurement value ($U_{sk}$), which is smaller than the air flow measurement value ($U_{so}$) at an air flow value of zero.

3. A method as defined by claim 1, wherein, the air flow measurement value ($U_s$) is delayed with an increasing air flow value (Q), within the selected range below the air flow measurement values ($U_{sm}$).

4. A method as defined by claim 1, wherein the modified characteristic curve of the air flow measuring device extending from the air flow value ($U_{so}$) at an air flow value of zero to the minimum air flow measurement value ($U_{sm}$) is a curve.

* * * * *